(No Model.)

A. L. GARFORD.
BICYCLE SADDLE.

No. 532,547. Patented Jan. 15, 1895.

Witnesses.
F. H. Griswold
N. M. Wood

Inventor.
Arthur L. Garford
By Wing & Thurston
his attys

UNITED STATES PATENT OFFICE.

ARTHUR L. GARFORD, OF ELYRIA, OHIO.

BICYCLE-SADDLE.

SPECIFICATION forming part of Letters Patent No. 532,547, dated January 15, 1895.

Application filed February 3, 1894. Serial No. 498,980. (No model.)

*To all whom it may concern:*

Be it known that I, ARTHUR L. GARFORD, a citizen of the United States, residing at Elyria, in the county of Lorain and State of Ohio, have invented certain new and useful Improvements in Bicycle - Saddles; and I do hereby declare the following to be a full, clear, and exact description of the invention, such as will enable others skilled in the art to which it appertains to make and use the same.

My invention relates to bicycle saddles.

The object is to provide a light, durable, and easy riding saddle; and the invention consists in the construction and combination of parts hereinafter described and pointed out in the claim.

Figure 1:
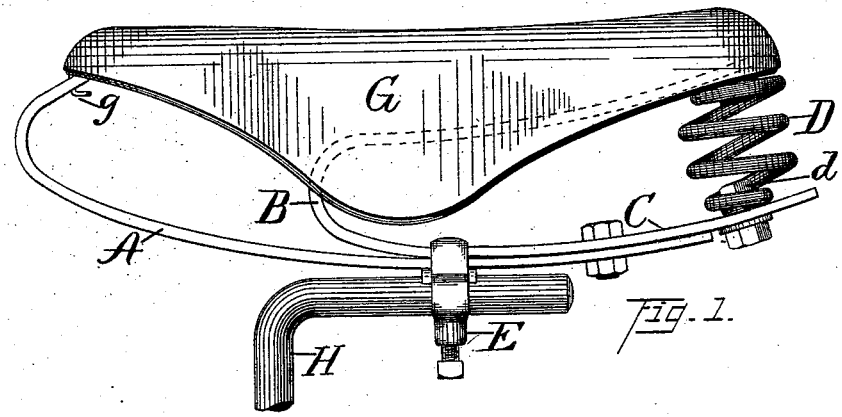
Figure 2:
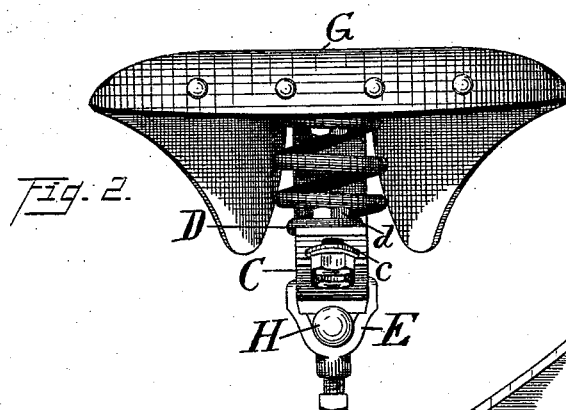
Figure 3:
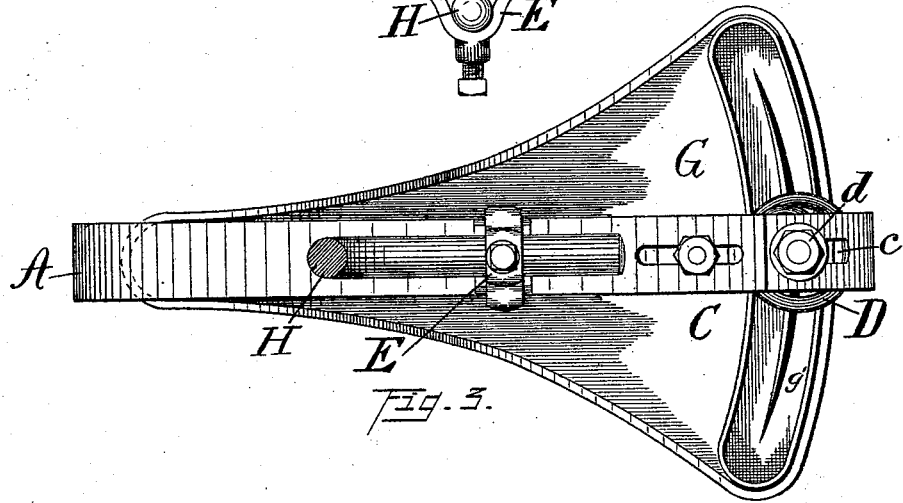

In the drawings, Figure 1 is a side view. Fig. 2 is a rear end view, and Fig. 3 is a bottom view of a saddle containing my invention.

A represents the front seat support which is attached at its forward end to the front end of the seat G by means of a hook $g$, or in any suitable manner. The support is made of spring metal, preferably a flat steel bar, and is so bent that, from the point of connection with the seat, it extends downward and slightly forward, and then rearward to and through the clamp D, by means of which the saddle is attached to the seat post of the bicycle,—the form of the forward end of this support being such that it may yield rearward when a rider is on the seat.

B represents the rear seat support, also made of spring steel, preferably a flat steel bar, which is attached in any suitable manner to the cantle of the saddle. From this point it extends downward and forward underneath the seat where it is attached to the spring A.

C represents an arm, also made of spring metal, which, at its forward end, is secured to one or the other of the two springs hereinbefore described, and it lies beneath the rear end of the seat.

In the form of the invention shown in the drawings, the spring B is U-shaped, and the spring C is an integral part of its lower leg. The spring C lies upon the rearward extension of the spring A and it is secured to spring A by a bolt $c$, which passes through holes in both springs. One of said holes is elongated into the form of a slot $a$, whereby the bolt may be moved in said slot for the purpose of adjusting the relative position of the two seat supporting springs,—the purpose of said adjustment being to regulate the tension of the leather seat G. Both springs A and B pass through the clamp E, by means of which they are held more securely together, and the saddle is secured to the seat post H of the bicycle. As shown, a single set screw secures the parts together as last described.

In the rear end of the spring C is a slot $c'$ through which the bolt $d$ passes,—said bolt being employed to attach the lower end of the coil spring D to the spring C. The upper end of said coil spring is secured beneath the rear end of the seat, and preferably to the rear seat support B close to the point where it is connected with the cantle $g'$.

It will be seen that in the described construction the rider's weight is sustained by four springs,—A, C, B and D, each of which is or may be in some degree called into action. The rear seat support (upper arm of spring B) may be made lighter than it could be were it not supported by the coil spring D. The relative strength of the springs should preferably be such that, under ordinary circumstances, the springs B and D are mainly called into action. When a rider is of unusual weight, or when the machine is suddenly or violently jarred, the springs C and A are called more into action, because the coil spring D becomes so much compressed that it is easier for the springs A and C to bend than for the coil spring to be any more compressed. By thus supporting the coil spring on a yielding spring support there will be considerable spring action under all conditions, and the strain upon the several springs is so distributed that there is little danger that any of them will break. If, however, any one of the four springs should break, the saddle is weakened, but it is not necessarily rendered inoperative.

Having described my invention, I claim—

A front spring seat support A which extends beneath the seat, a substantially U-shaped rear spring seat support, the lower leg of which rests upon the support A, a seat secured to the front support and to the end of the upper leg of the rear support, a device for adjustably connecting the two seat supports, a seat post clamp which embraces both seat supports, and a vertical coil spring secured to and between the ends of the U-shaped spring, substantially as and for the purpose specified.

In testimony whereof I affix my signature in presence of two witnesses.

ARTHUR L. GARFORD.

Witnesses:
P. H. BOYNTON,
E. L. THURSTON.